J. B. TAYLOR.
Potato-Digger.
No. 223,189.                     Patented Dec. 30, 1879.
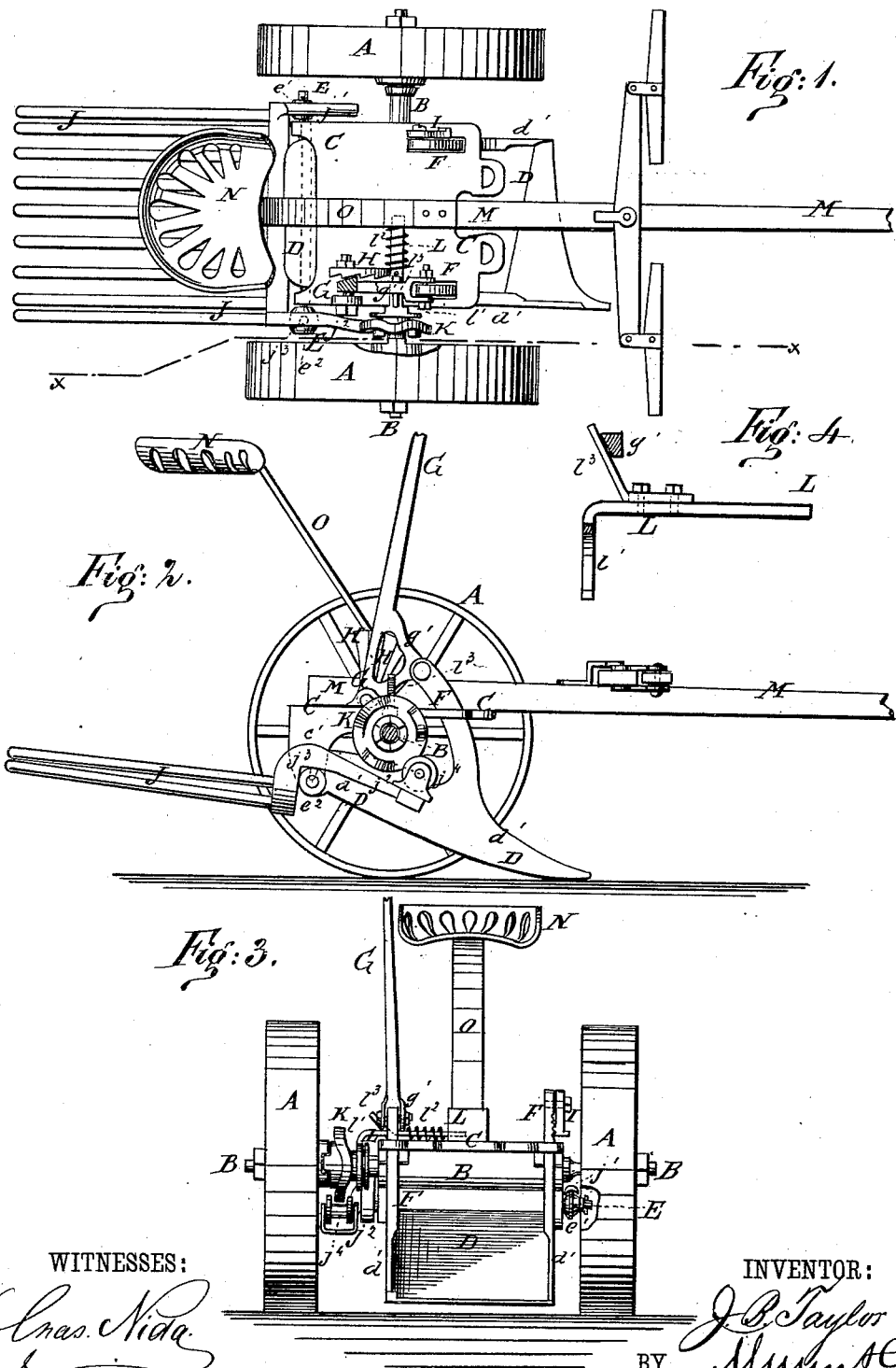

UNITED STATES PATENT OFFICE.

JAMES B. TAYLOR, OF WEST HURLEY, NEW YORK.

IMPROVEMENT IN POTATO-DIGGERS.

Specification forming part of Letters Patent No. 223,189, dated December 30, 1879; application filed April 29, 1879.

*To all whom it may concern:*

Be it known that I, JAMES BARKER TAYLOR, of West Hurley, in the county of Ulster and State of New York, have invented a new and useful Improvement in Potato-Diggers, of which the following is a specification.

Figure 1 is a top view of my improved machine. Fig. 2 is a side view of the same, partly in section, through the line $x\ x$, Fig. 1. Fig. 3 is a front view of the same. Fig. 4 is a detail view of the shifting-bar, showing a modification of construction.

Similar letters of reference indicate corresponding parts.

The object of this invention is to furnish an improved machine for digging potatoes, and which may also be used for loosening the soil and destroying grass and weeds between the rows, which shall be simple in construction, convenient in use, and effective in operation.

The invention consists in the combination of the screen, provided with the arm having a groove formed in its lower side, and the arm having a pin attached to it and a grooved wheel pivoted to its forward end, the long bolt, provided with a small wheel at one end and a spherical head at the other end, and the zigzag wheel, with the plow, the frame, the axle, and the wheel; in the combination of the lever, provided with the angle arm or bracket, with the frame, the curved arm of the plow, and the ratchet; in the combination of the shifting-bar, provided with the fork, the spiral spring, and the inclined or curved arm, with the frame, the zigzag wheel, and the lever provided with the angle arm or bracket, as hereinafter fully described.

A are the wheels, which revolve loosely upon the axle B. To the axle B is attached the frame C, which has downwardly-projecting lugs or arms $c'$ formed upon its rear corners.

D is the plow, which is made with a detachable point and share, and is hinged at its rear end to the lugs $c'$ of the frame C by a long bolt, E.

The plow D is made with upwardly-projecting flanges $d'$ upon its side edges, to prevent the potatoes and soil from passing off at the said side edges. Upon the sides of the forward part of the plow D are formed, or to it are attached, two arms, F, which are curved upon the arcs of circles having their centers at the axis of the bolt E, and which pass through holes in the forward corners of the frame C.

To the middle part of one side of the frame C, a little in the rear of the axle B, is pivoted the lower end of the lever G, upon the lower part of the forward side of which is formed an angular projection, bracket, or bell-crank, $g'$. The bracket $g'$ is pivoted at its angle to one of the arms F, so that the plow D may be raised and lowered, as required, by operating the lever G. The lower part of the inner side of the lever G is beveled, so that it may engage with the teeth of the ratchet H, attached to the frame C, and hold the plow securely in any position into which it may be adjusted.

The lever G is kept in contact with the ratchet by a coiled spring applied upon the fulcrum of the lever. The downward movement of the plow D is limited by the stop-block I, attached to the side of the upper end of the other arm F, and which is slotted to receive the bolt by which it is secured to the said arm, so that it may be adjusted as may be required.

The adjacent sides of the stop-block I and the arm F are toothed or roughened to give them a firmer hold upon each other.

The soil and potatoes pass from the rear end of the plow D to the screen or sifter J, through which the soil passes to the ground, and from the rear end of which the potatoes drop to the ground, so that they will lie upon the surface of the soil ready to be picked. The screen J is formed by attaching the forward ends of a number of parallel bars or rods to a cross-bar. Upon one forward corner of the screen J is attached an arm, $j'$, which projects forward, and is grooved upon its lower side to receive the V-shaped face of the small wheel $e'$, pivoted to the end of the long bolt E. Upon the other forward corner of the screen J is formed, or to it is attached, an arm, $j^2$, which projects forward, and to which, near the said corner, is attached a pin, $j^3$, which enters a hole in the spherical head $e^2$, formed upon the end of the bolt E. To the forward end of the arm $j^2$ is pivoted a grooved wheel, $j^4$, to receive the edge of the zigzag wheel K, which runs loosely upon the axle B. Upon the outer end of the hub of the zigzag wheel K are formed clutch-teeth, to engage with clutch-teeth formed upon the inner end of the hub of the drive-wheel A, so that the said drive-wheel may carry the said zigzag wheel with it in its revolution, and thus oscillate the screen J, to shake the dirt from the potatoes before the said potatoes have reached the rear end of the said screen. Upon the inner end of the hub of the zigzag wheel K is formed a ring-groove, to receive the fork $l'$, formed upon the lower side of the outer end of the shifting-bar L, which slides in keepers attached to the frame C, and is drawn and held inward by a coiled spring, $l^2$, placed upon its outer part. Upon the upper side of the outer part of the shifting-bar L is formed, or to it is attached, an inclined or curved arm, $l^3$, as shown in Figs. 2 and 4.

With this construction, as the lever G is moved forward to lower the plow D into working position the lower arm of the bracket $g'$ strikes against the inclined arm $l^3$ and pushes the zigzag wheel K outward and into gear with the wheel A, so that the screen J will always be oscillated when the machine is at work.

When the lever G is moved to the rearward to raise the plow D from the ground the arm of the bracket $g'$ will be raised from the inclined arm $l^3$, allowing the spring $l^2$ to draw the zigzag wheel K inward and out of gear with the wheel A, stopping the oscillation of the said screen.

I prefer to make the inclined or curved arm $l^3$ separate and detachable, so that it may be moved back to take up the wear.

M is the tongue, to which the draft is applied, and the rear end of which is secured to the middle part of the frame C.

N is the driver's seat, which is attached to the upper end of the spring-standard O. The lower end of the standard O is bolted to the rear end of the tongue M. The seat-standard O is inclined to the rearward, as shown in Fig. 2, so that the driver's weight may balance the down-draft of the plow D.

Having thus described my invention, I claim as new and desire to secure by Letters Patent—

1. The combination of the screen J, provided with the arm $j'$, having a groove formed in its lower side, and the arm $j^2$, having a pin, $j^3$, attached to it and a grooved wheel, $j^4$, pivoted to its forward end, the long bolt E, provided with a small wheel, $e'$, at one end and a spherical head, $e^2$, at the other end, and the zigzag wheel K, with the plow D, the frame C, the axle B, and the wheel A, substantially as herein shown and described.

2. The shifting-bar L, provided with the curved or inclined arm $l^3$, to adapt the said bar to be operated by the lever G while the plow is being lowered by the said lever, substantially as shown and described.

3. In a potato-digger, the lever G, provided with the bracket $g'$, in combination with the curved arm F of the plow D, the shifting-bar L, provided with the inclined arm $l^3$, the zigzag wheel K, arm $j'$, and screen J, substantially as and for the purpose set forth.

JAMES BARKER TAYLOR.

Witnesses:
W. C. NEWTON,
GEORGE DART.